Jan. 1, 1935. H. O. FISCHER 1,986,505
BOTTLE CAPPING MACHINE
Filed Oct. 14, 1932 11 Sheets-Sheet 6
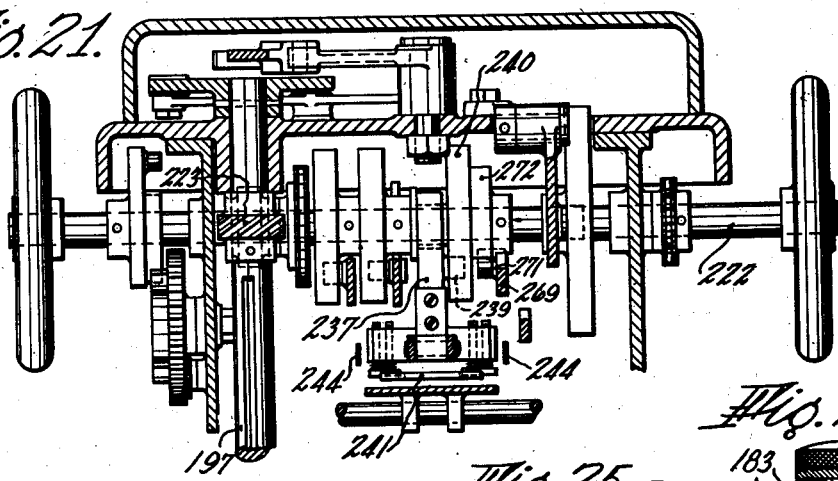
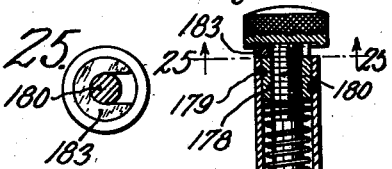
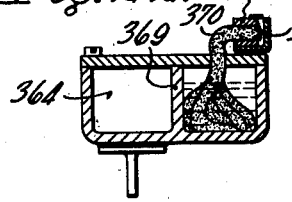
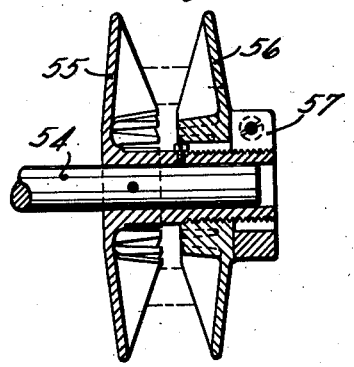
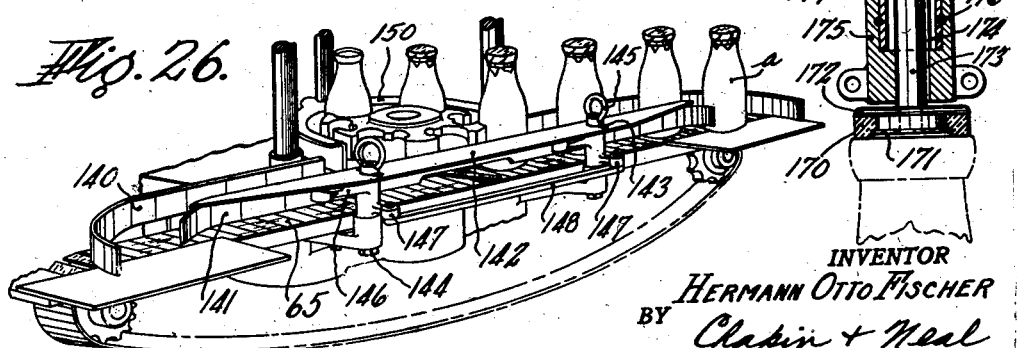
INVENTOR
HERMANN OTTO FISCHER
BY Chapin + Neal
ATTORNEY

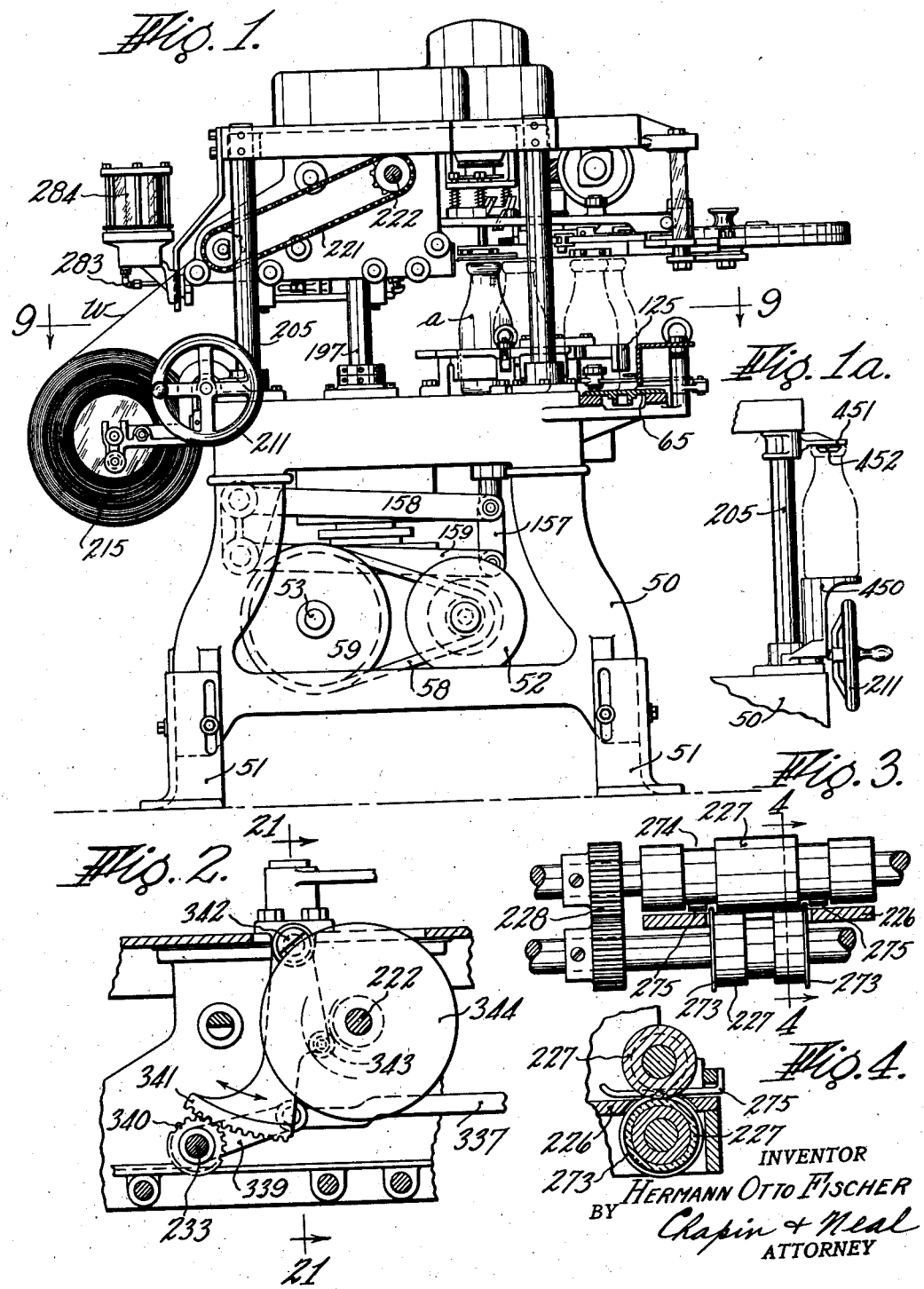

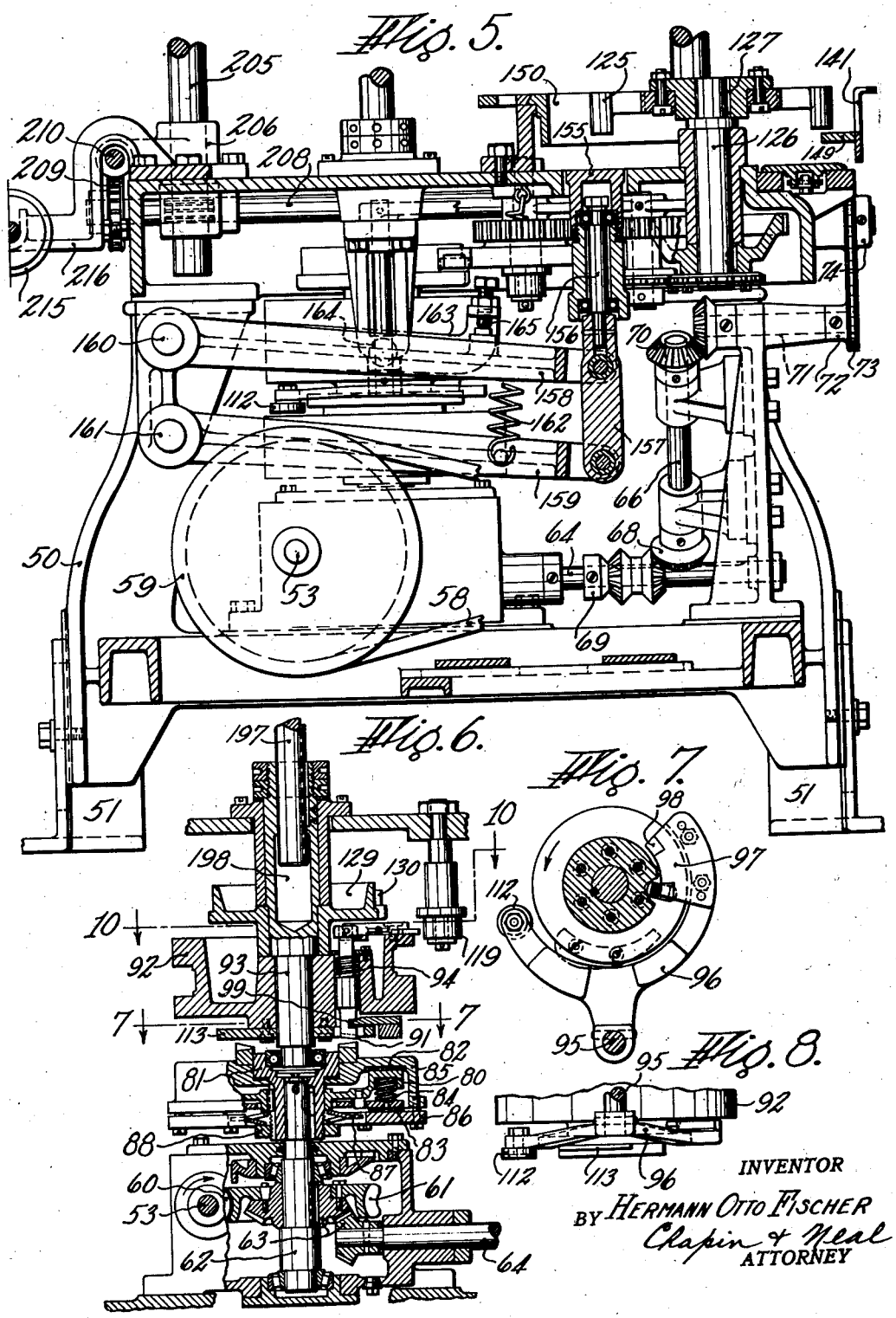

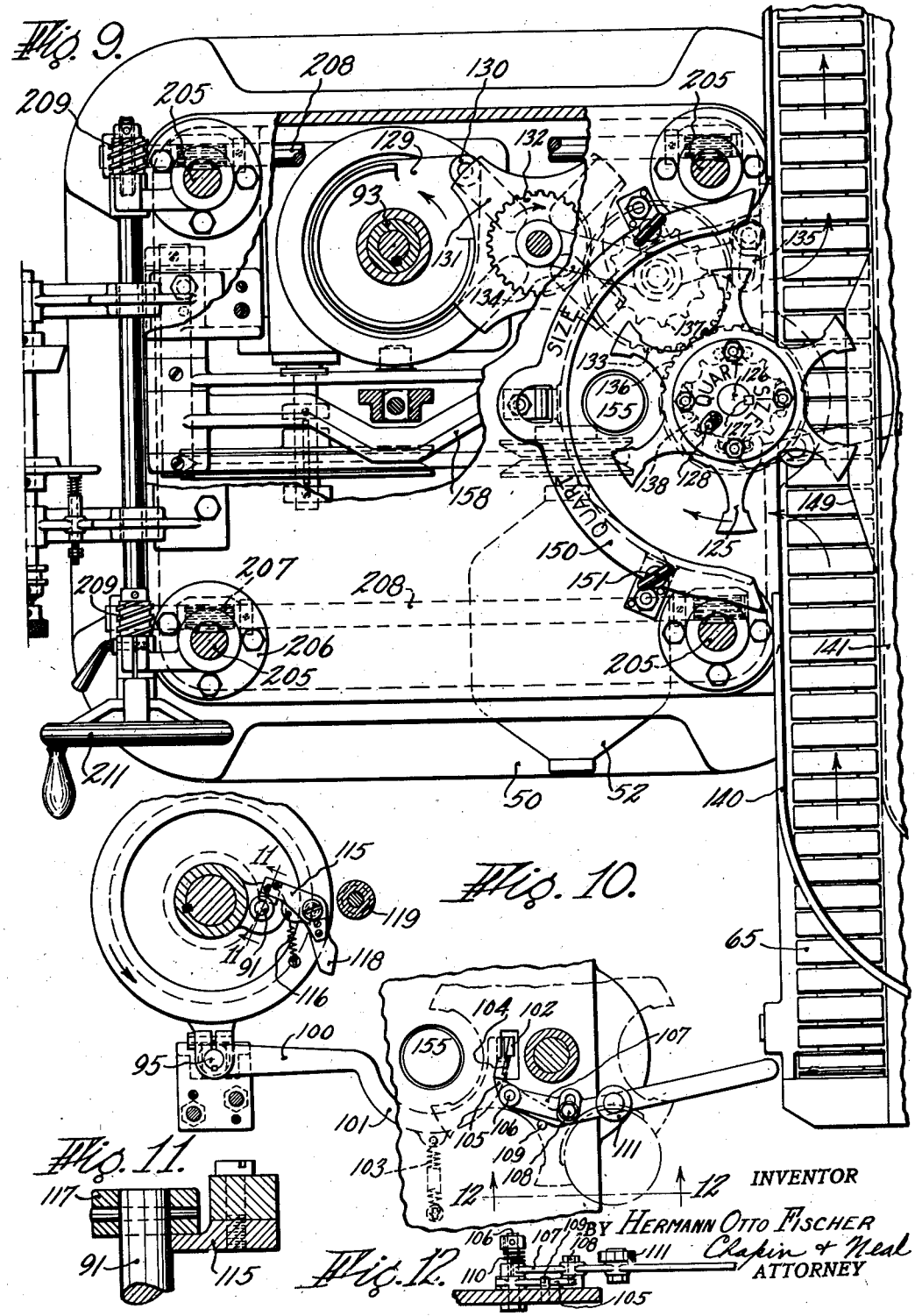

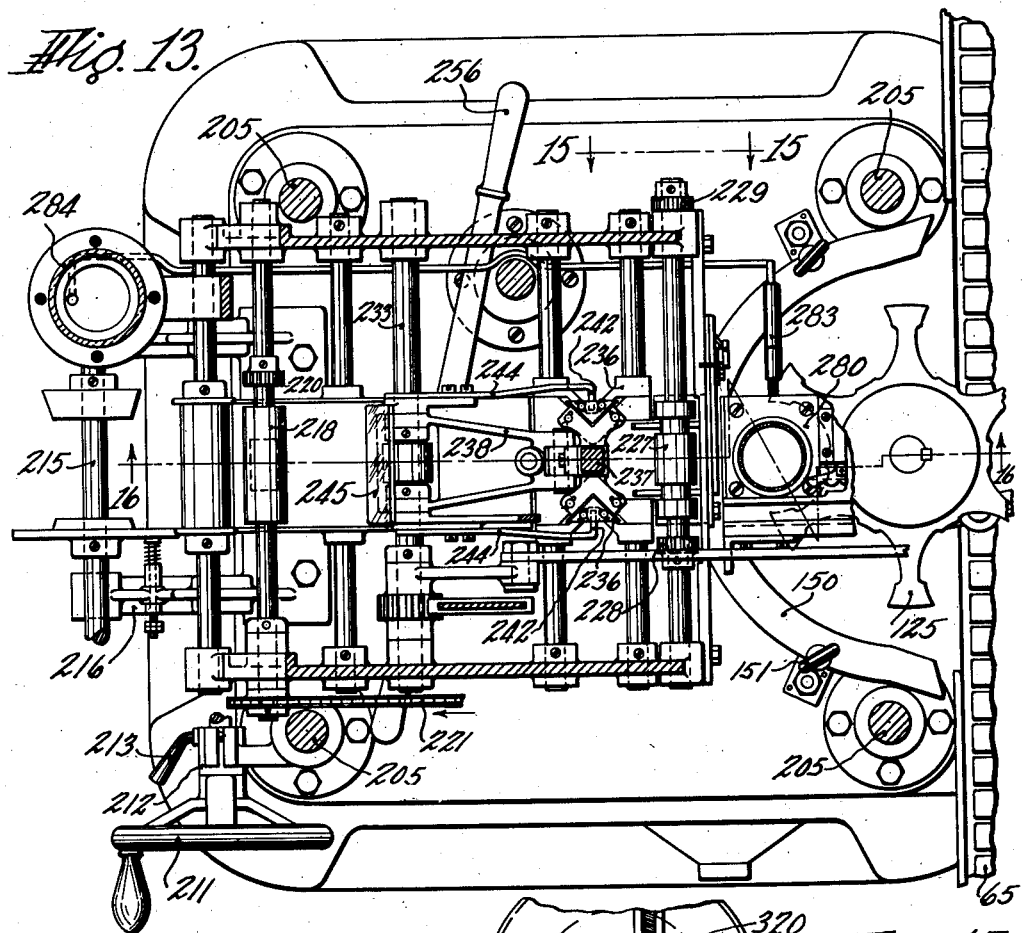
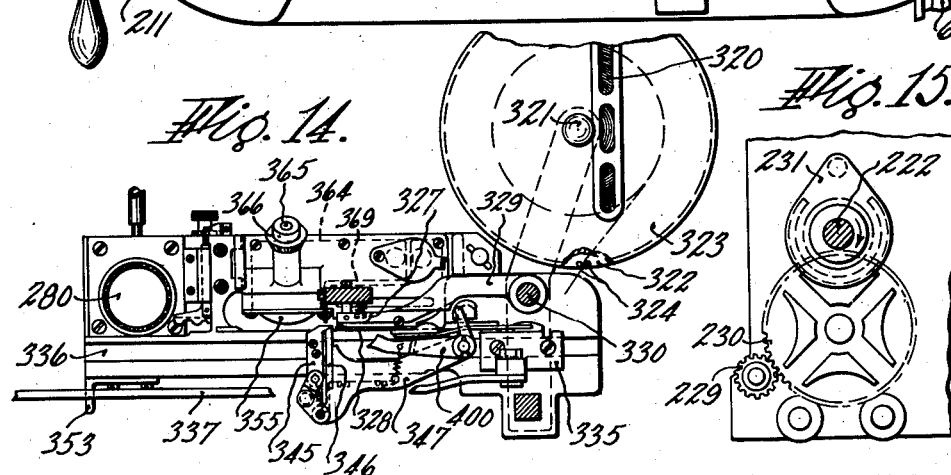

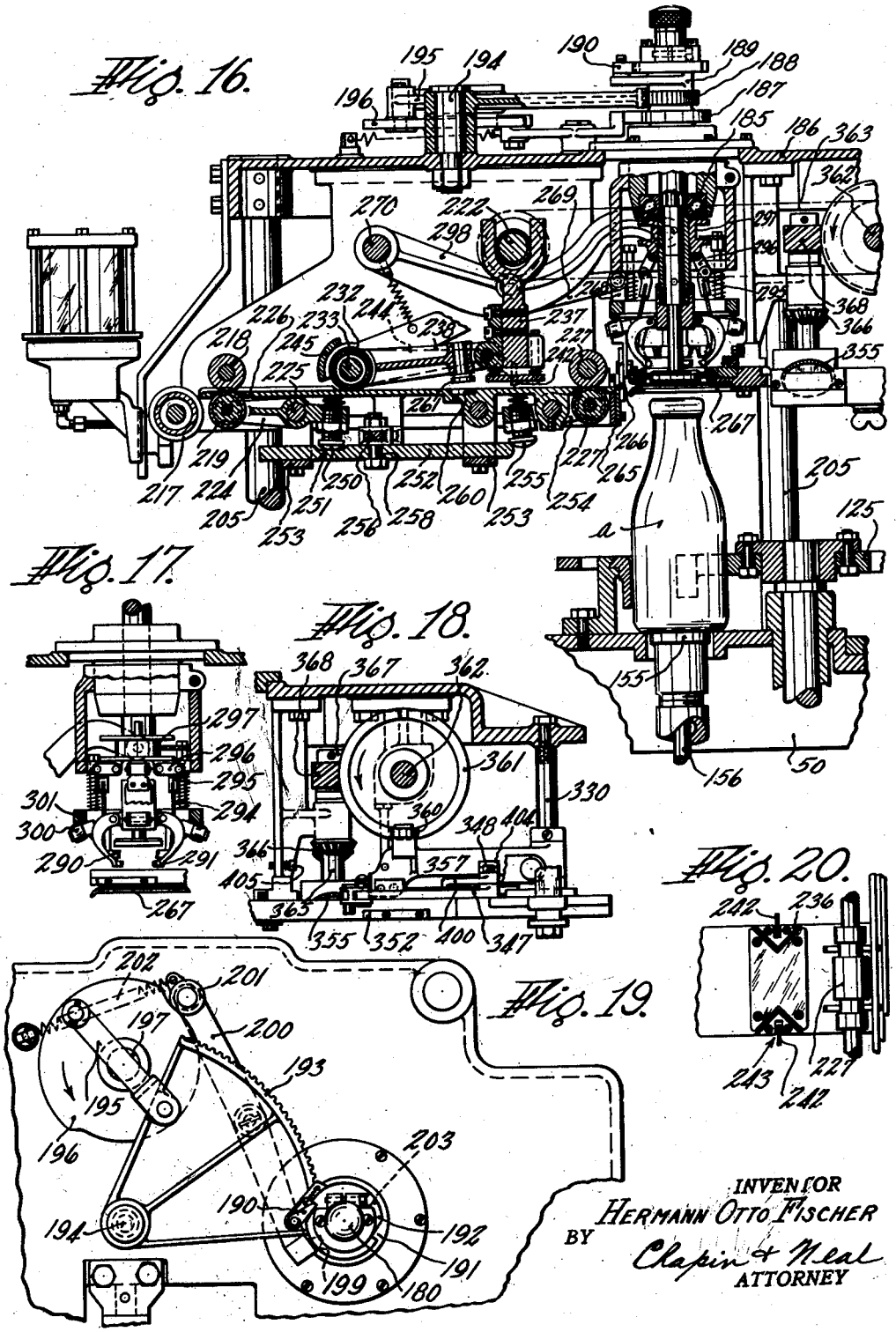

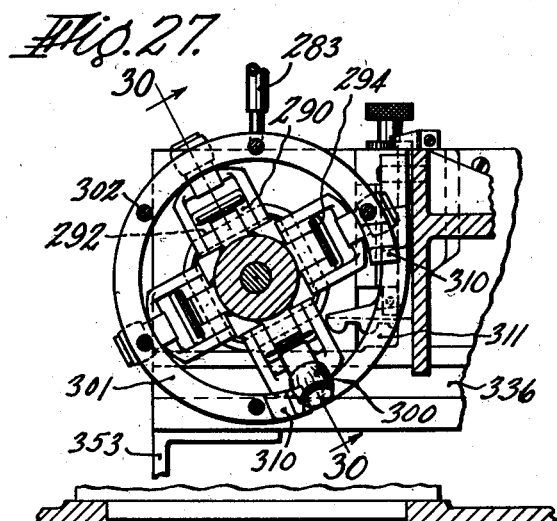
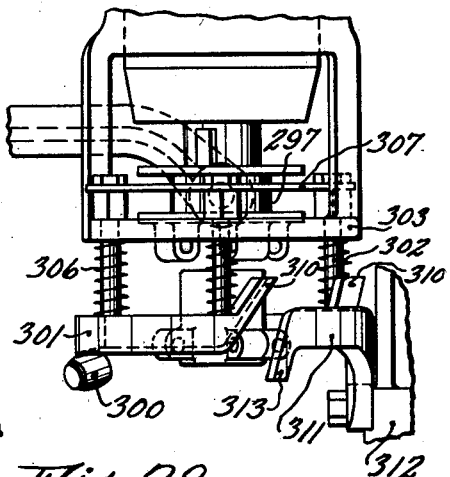
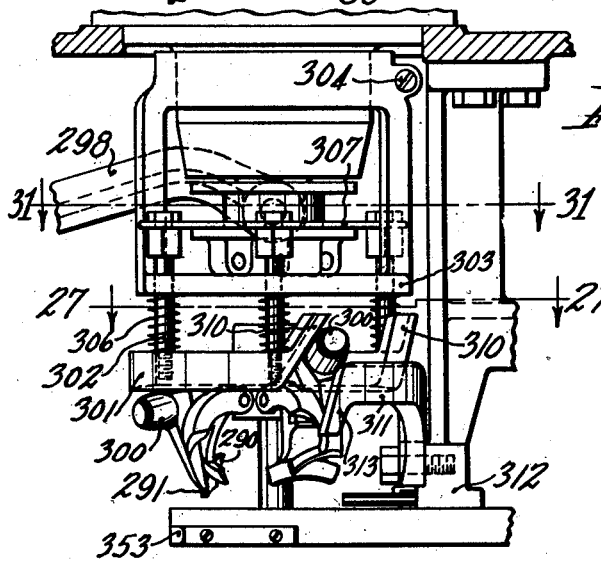
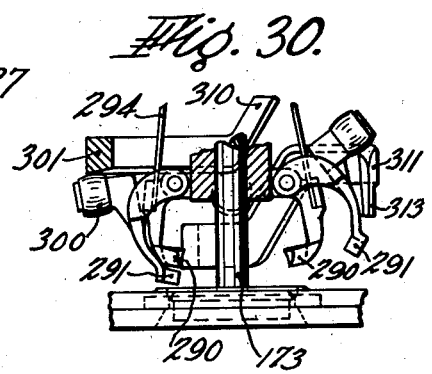
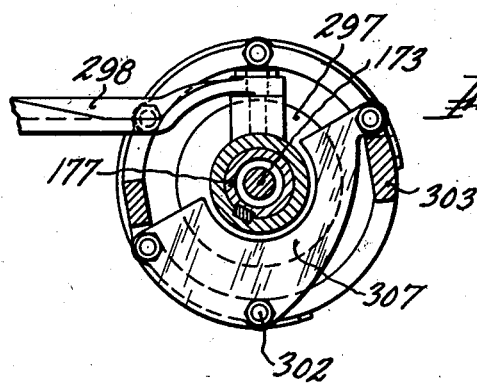

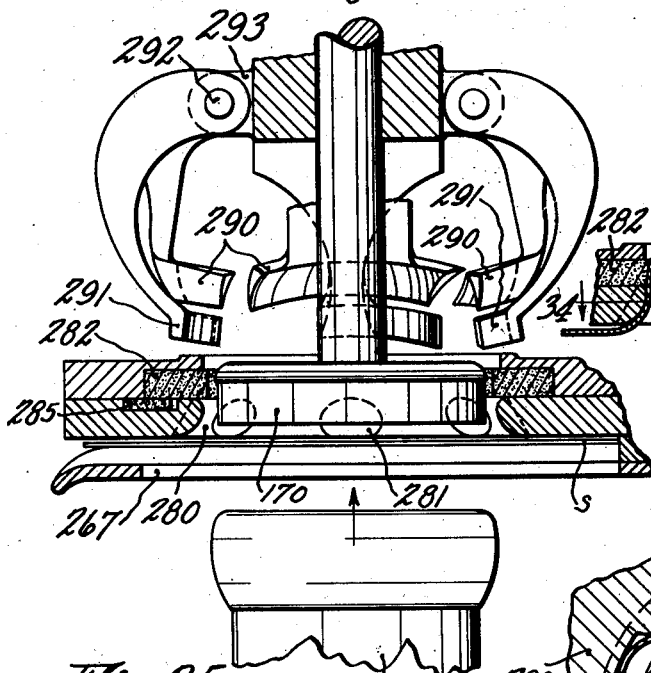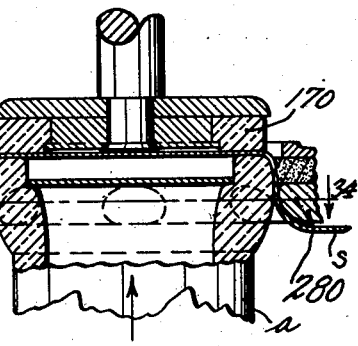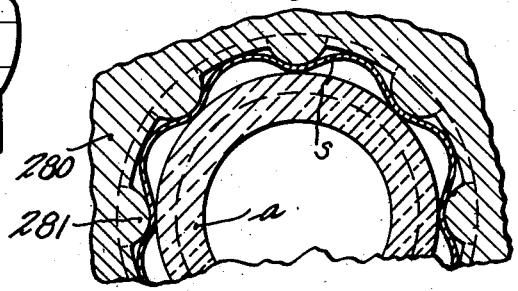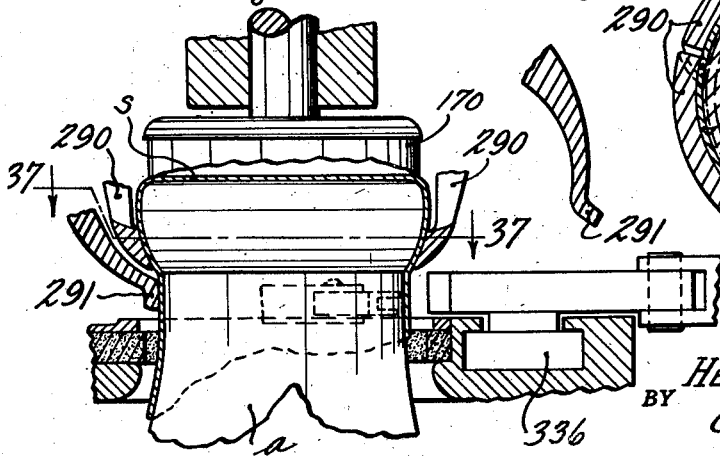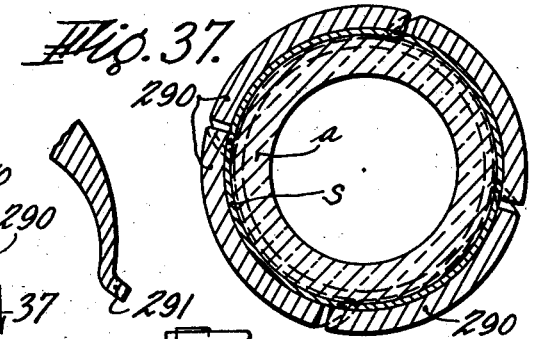

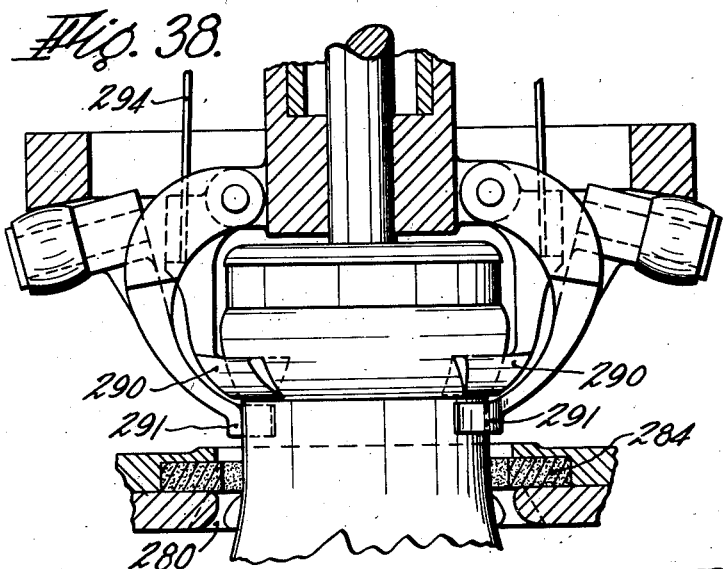
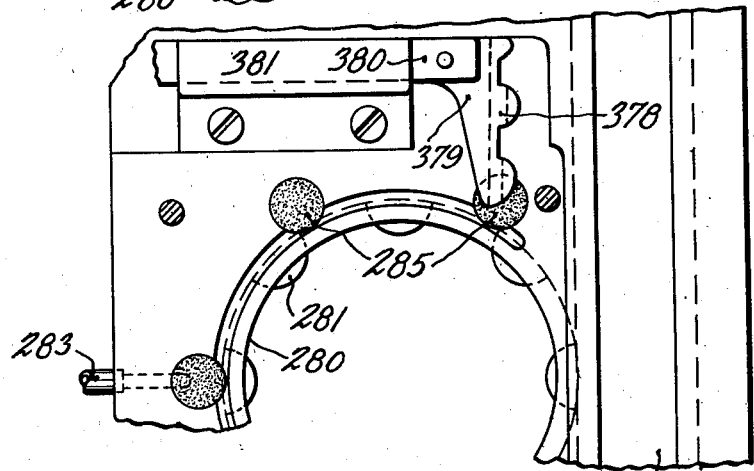
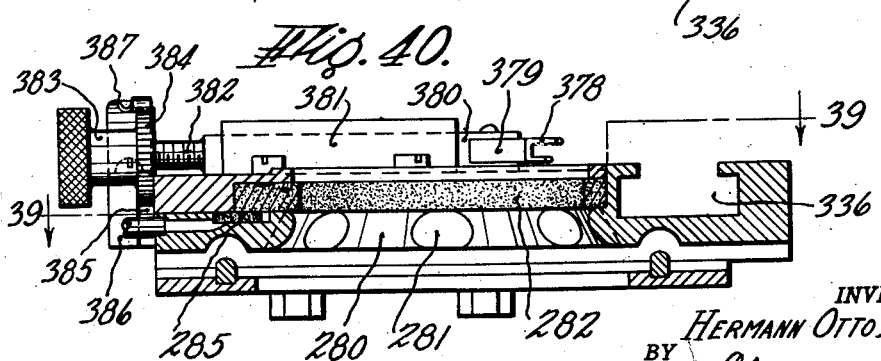

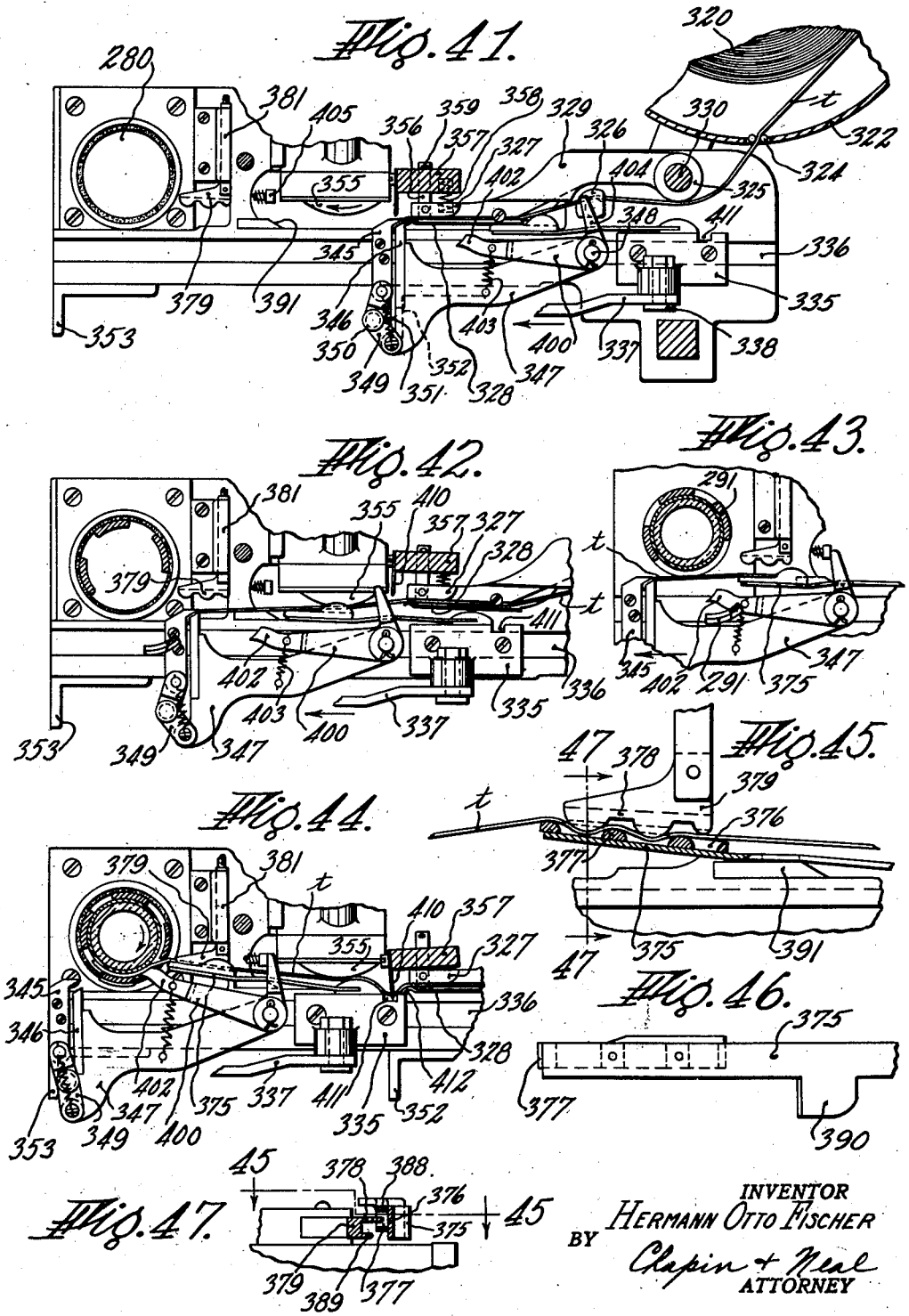

Jan. 1, 1935.  H. O. FISCHER  1,986,505
BOTTLE CAPPING MACHINE
Filed Oct. 14, 1932  11 Sheets-Sheet 11
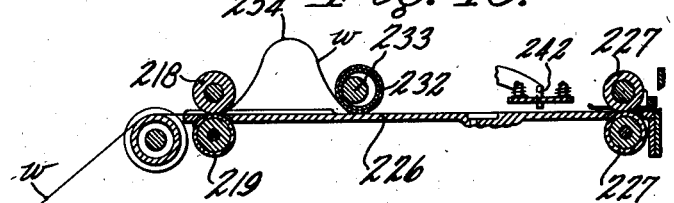
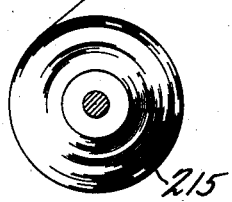
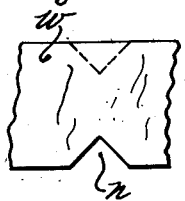
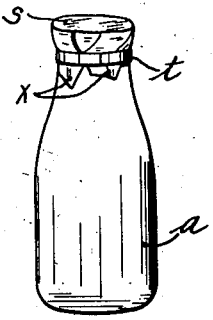
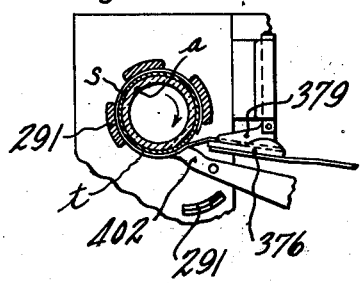
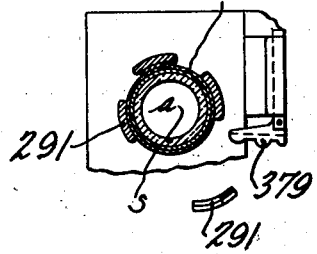
INVENTOR
HERMANN OTTO FISCHER
BY Chapin + Neal
ATTORNEY Patented Jan. 1, 1935

1,986,505

UNITED STATES PATENT OFFICE 1,986,505

BOTTLE CAPPING MACHINE

Hermann Otto Fischer, Springfield, Mass., assignor to Package Machinery Company, Springfield, Mass., a corporation of Massachusetts Application October 14, 1932, Serial No. 637,813

36 Claims. (Cl. 226—83)

This invention relates to machines for applying hoods to bottles, and will be described in its preferred form as adapted for forming a hood out of a flexible material such as paper, foil, or cellulose or cellulose acetate sheeting and securing it in place around the bottle neck by an adhesively applied tape. One object of the invention is the provision of a machine which will form and seal to the bottle a hood formed of moisture-proof cellulose sheeting. Another object is to provide improved bottle handling mechanism. Another object is to provide improved mechanism for feeding the blank of hood material and preliminarily shaping the hood. Another object is to provide improved mechanism for conforming the hoods to the bottles. Another object is to provide improved mechanism for delivering a tape to the neck of the bottle and for winding the tape around the neck. Another object is to provide improved mechanism for driving the several mechanisms and for coordinating their action. Additional objects will appear from the following description and claims.

Referring to the drawings,

Fig. 1 is a side elevation of the machine;

Fig. 1a is a detail of a modification;

Fig. 2 is a section showing the main cam shaft and certain parts operated by it;

Fig. 3 is a detail showing in front elevation the rolls for feeding the strip from which the hood material is formed;

Fig. 4 is a section on line 4—4 of Fig. 3;

Fig. 5 is a side view, on a larger scale and partly broken away, of certain mechanisms shown in Fig. 1;

Fig. 6 is a detail of certain mechanisms shown in Fig. 5, taken in median section;

Fig. 7 is a section on line 7—7 of Fig. 6;

Fig. 8 is a side view of the mechanism shown in Fig. 7;

Fig. 9 is a plan view of certain mechanisms, taken substantially on line 9—9 of Fig. 1;

Fig. 10 is a section on line 10—10 of Fig. 6;

Fig. 11 is a sectional detail on line 11—11 of Fig. 10, with the parts differently positioned, and on a larger scale;

Fig. 12 is a section on line 12—12 of Fig. 10;

Fig. 13 is a plan view of the machine with the upper portion broken away to show the mechanism for feeding the hood material;

Fig. 14 is a detail plan of the tape feed;

Fig. 15 is an elevational detail of a part of the driving mechanism for the hood material feed, looking from the line 15—15 in Fig. 13;

Fig. 16 is a section on line 16—16 of Fig. 13;

Fig. 17 is a side elevation of the hood conforming mechanism appearing in Fig. 16, with the parts in a different position of operation;

Fig. 18 is a section showing mechanism connected with the tape feed and broken off for lack of space in Fig. 16;

Fig. 19 is a top plan view of mechanism appearing in Fig. 16;

Fig. 20 is a detail plan of certain notching cutters and feed rolls shown in Fig. 16;

Fig. 21 is a detail of the main cam shaft, taken on line 21—21 of Fig. 2;

Fig. 22 is a detail of the device for rendering the surface of the tape adhesive, showing the employment of a solvent-carrying wick;

Fig. 23 is a detail of a preferred form of motor pulley;

Fig. 24 is a view, on a larger scale and in median section, of certain mechanism shown in Fig. 16;

Fig. 25 is a section on line 25—25 of Fig. 24;

Fig. 26 is a perspective detail showing the manner in which bottles are fed through the machine;

Fig. 27 is a sectional plan showing the mechanism for operating the fingers which hold the tape to the bottle neck, taken on line 27—27 on Fig. 28;

Fig. 28 is a side elevation of the mechanism for operating the tape-holding fingers;

Fig. 29 is a similar fragmentary view with some parts removed and with others in different positions of operation;

Fig. 30 is a detail illustrating the manner in which the tape-holding fingers operate,—taken on line 30—30 of Fig. 27;

Fig. 31 is a section on line 31—31 of Fig. 28;

Fig. 32 is a detail showing a bottle about to be pushed into the hooding mechanism;

Fig. 33 is a similar view showing a later stage, with all parts in median section;

Fig. 34 is a section on line 34—34 of Fig. 33;

Fig. 35 is a detail sectional plan showing a later stage;

Fig. 36 is a view similar to Figs. 32 and 33 showing the condition of the bottle and hood at the time of applying the tape;

Fig. 37 is a section on line 37—37 of Fig. 36;

Fig. 38 is a side elevation showing both sets of fingers in contact with the bottle;

Fig. 39 is a top view of the hood plaiting die, taken on line 39—39 of Fig. 40;

Fig. 40 is a central vertical section through the hood plaiting die;

Figs. 41, 42, 43, and 44 are plan views showing successive stages in the tape-applying operation;

Fig. 45 is a detail plan of a tape tension device, taken on line 45—45 of Fig. 47;

Fig. 46 is an elevational detail of a portion of the tape tension device;

Fig. 47 is a section on line 47—47 of Fig. 45;

Fig. 48 is a detail of the feeding mechanism for the hooding material;

Fig. 49 is a detail plan similar to Fig. 20 but showing a modification;

Fig. 50 is a detail of the hooding material web after having been notched by the mechanism of Fig. 49;

Fig. 51 is a detail of the completely severed blank prepared by the mechanism of Fig. 49, and indicating by dotted lines the form of a blank prepared by the mechanism of Fig. 20;

Fig. 52 is a detail of a bottle hooded with a blank prepared by the mechanism of Fig. 20;

Fig. 53 is a similar view of a bottle hooded with a blank prepared by the mechanism of Fig. 49; and Figs. 54 and 55 are details similar to Fig. 44 illustrating successive stages in the application of the hood securing tape.

Before entering upon a detailed description of the mechanism a brief summary of the operation of the machine will be given. Bottles are placed upon a continuously moving conveyer which carries them to an intermittently rotating star wheel. A stop mechanism control is arranged at the point of entry into the star wheel so that neither the wheel nor the hooding mechanism will operate unless a bottle is present. The wheel carries the bottles successively onto an elevating plunger which on its ascent temporarily raises the bottle into a hooding head. As the bottle rises, a blank of hood material is held across the bottle top by an upper plunger, and is carried through a die which folds it down around the neck of the bottle. A circular series of holding fingers then grasp the plaited hood to keep it from unfolding. The end of an adhesive tape or band is projected into a position near the lower part of the hood, and is forced against the hood by one of a second set of fingers. As soon as this is done the bottle is rotated, the tape-holding fingers closing one at a time upon it until the desired length of tape is wound up and cut off, and being lifted over the tangential portion of the tape at each revolution. When the band is complete the bottle is lowered, and is then reset by the star wheel upon the original continuously moving conveyer.

The machine is supported upon a main frame 50, preferably provided with adjustable leveling feet 51. A motor 52 furnishes the driving power for the entire mechanism, being mounted in the frame by the usual bolt and slot connections so that it may be moved towards or away from the drive shaft 53. Upon the motor shaft 54 (Fig. 23) is fixed one member 55 of an internal conical pulley, the other member 56 of which is threaded in place and held by a clamp collar 57. A belt 58 (Fig. 1) connects this pulley to a pulley 59 on the drive shaft 53. By spreading or closing the conical pulley and making a corresponding change in the motor position the speed of the mechanism may be varied so that it may be synchronized with a bottle filling machine.

Drive shaft 53 bears a worm 60 (Fig. 6) meshing with a worm wheel 61 keyed to a vertical shaft 62. Bevel gears 63 connect the worm wheel to a horizontal shaft 84 from which is taken the drive for the continuous bottle conveyer 65. In order to increase the adaptability of the machine to various operating conditions the conveyer is arranged to be driven optionally in either direction. For this purpose the shaft 64 (Fig. 5) is coupled to a slanting jack shaft 66 by a double bevel gear 67 and a bevel gear 68, the gear 67 being fixable on either side of the gear 68 by a collar 69. Jack shaft 66 is coupled by bevel gearing 70 to a stub shaft 71 bearing a sprocket 72. A chain 73 connects this sprocket to either one of two sprockets 74 (one only of which appears in Fig. 5) on the drive shafts of the conveyer 65. The chain 73 is shifted from one to the other of the sprockets in accordance with the direction of travel of the conveyer, so that the upper reach of the conveyer (which is preferably of the type presenting a flat surface of metal slats) is always under tension.

The remaining mechanism is driven from the shaft 62 through an overload release and a stop mechanism operated by the incoming bottles. The overload release has for its driving element a clutch member 80 (Fig. 6) splined on a sleeve 81 which is fixed to a reduced portion of the shaft 62. This member bears friction surfaces 82 and 83, pressed apart by springs 84 so as to engage the dished portion 85 and the cover portion 86 respectively of the driven member of the release mechanism. A centralizing spring disk 87, adjustable by a collar 88 counterbalances the weight of the member 80.

Upon the clutch member 85 are secured a plurality of clutch teeth 90 adapted to coact with a dog 91 slidably mounted in the body of a cylindrical cam 92 keyed upon a vertical stub shaft 93. This shaft is journaled both in the frame and in the top of sleeve 81 so that no rotation will be imparted to it except when the dog 91 is in engagement with one of the clutch teeth. Normally the dog is held down in engagement with the clutch teeth by a spring 94. In the absence of a bottle from the star wheel the dog is raised clear of the teeth by mechanism which will now be described. Fixed to a vertical rock shaft 95 (Figs. 7, 8) is a tripping yoke 96 carrying at one end an arcuate plate 97 beveled at 98 at each end. When the yoke is swung into the position of Fig. 7 the plate is in the path of a slot 99 in the dog 91, causing the dog to ride up on the plate as it is rotated by the clutch teeth until it is finally drawn clear of them. Rotation of the cam 92 and the machine parts connected with it thereupon stops until the yoke is again swung clockwise as viewed in Fig. 7. Fixed to the upper end of shaft 95 is an arm 100 (Fig. 10) curved at 101 to avoid certain machine parts and carrying at its end an abutment 102. A spring 103 tends to draw the arm in a direction to cause clockwise rotation of the yoke and to withdraw the plate 97 from the path of the dog. In the absence of a bottle the arm 100 is restrained against the tension of the spring by an abutment 104 carried upon a lever 105 pivoted to the frame at 106. For operating purposes this lever is a unit with an arm 107 (Figs. 10 and 11) also pivoted at 106 and adjustably clamped to the lever at 108. This adjustment is used in changing over the machine for different sized milk bottles. The arm 107 and lever 105 are rotated in a clockwise direction against a stop 109 by a spring 110, and the arm bears a roll 111 by which it may be rocked against the force of the spring by the pressure of a bottle entering the star wheel.

As long as bottles arrive in constant succession at the star wheel the lever 105 is periodically rocked counterclockwise to remove its abutment 104 from the path of abutment 102 so that the yoke plate 97 may be swung clear of the dog 91 by the action of spring 103. The dog is thus left in contact with the clutch teeth until a full revolution brings it again within the range of the plate. It is necessary at each revolution to move the yoke 96 and the arm 100 counterclockwise in order that they may be held by engagement of the abutments 102 and 104 if no bottle is present. For this purpose the yoke is provided with a roller 112 (Figs. 7 and 8) which is engaged by a reset cam 113 at each revolution. The yoke is thus moved periodically into dog tripping position at a time prior to that at which the dog reaches the plate 97. If a bottle is present the yoke returns to its inactive position before the dog reaches the plate; if no bottle is present the yoke is held by the abutments 102, 104 in its tripping position and the mechanism is halted until a bottle arrives. It will be noted that on account of the plurality of clutch teeth 90 it is not necessary for the machine to remain idle a full cycle, the mechanism restarting as soon as the continuously moving conveyer brings a bottle into position. The arm 107 is extended to form a handle by which the machine may be run by power irrespective of the presence of a bottle if desired.

It is sometimes desirable to turn the machine over by hand, and due to the irreversible worm drive employed it is necessary to do this with the clutch disconnected. A latch 115 (Fig. 10) is therefore provided, swung by a spring 116 to engage under the head 117 (Fig. 11) of the clutch dog when the latter is raised. When the dog is depressed the latch rests against the periphery of the head so that it offers no obstacle to the dog being raised. Once during each revolution, at a time when the dog is still engaged by the plate 97, the latch is moved clear of the dog by reason of its tail portion 118 striking a fixed tripping roll 119. If the plate 97 is in tripping position at the time the dog will remain up and the machine will stop. If the plate 97 is released by the presence of a bottle the dog will drop before the latch has passed the roll 119. If it be desired to turn the machine by hand from its stopped position (by a hand wheel to be described later) the latch will pass the roll 119 while the dog is still held up by the plate and will, therefore, snap into position under the head 117 and hold the dog out of engagement with the clutch teeth. To resume power operation it is necessary to stop the machine by hand with the dog resting on plate 97.

The star wheel 125 by which the bottles are received from the feeding conveyer is detachably mounted on a vertical shaft 126 by a key 127 (Fig. 9) and a set screw 128, so that it may be changed to a wheel of other dimensions to accommodate different sizes of bottles. The wheel is driven intermittently from the shaft by a Geneva movement and intermediate gearing. The driving member 129 (Fig. 9) of the Geneva is fixed to the shaft 93 and carries a driving roll 130 coacting with a driven member 131. A gear 132 fixed to the driven member meshes with a gear 133 rotatable upon an arm 134 swinging on the shaft of the driven member and held in adjusted position by a bolt and slot connection 135 with the frame. The ratio between the gears 132 and 133 is such as to compensate for any variation between the number of divisions of the driven Geneva member and the star wheel, here shown as four and six respectively. Adjustment of the arm 134 is for the purpose of providing for a reversal of rotation of the star wheel to correspond with the direction of travel of the feeding conveyer. To obtain a clockwise rotation of the star wheel the arm is set so that gear 133 meshes with a gear 136 on the star wheel shaft. If a reverse direction of rotation is desired the arm is swung so as to separate the gears 133 and 136 and the drive is obtained by a chain joining a sprocket 137 connected to the gear 133 and a sprocket 138 on the star wheel shaft.

In order to guide the bottles as they are fed by the conveyer and the star wheel inner guides 140 are arranged along the conveyer at each side of the star wheel, and a guide 141 is mounted along the outer side of the conveyer. The outer guide is supported on a plate 142 (Fig. 26) transversely slotted at 143 to receive studs 144 and clamped in position by nuts 145. To insure that the guide 141 will always remain parallel to the guides 140 the former is preferably connected to arms 146 pivoted to the studs 144 and having projecting therefrom a second series of arms 147. The latter arms are connected by a link 148 so as to provide a parallel motion mechanism. Guide 141 is fitted with an angular portion 149 (Fig. 9) serving to direct the bottles into the pockets of the star wheel. A semi-circular guide 150, held in place by thumb nuts 151, keeps the bottles in the pockets of the star wheel during its rotation.

The first stop of the star wheel after it receives a bottle $a$ is idle, the second places the bottle upon an elevator 155 (Figs. 5, 9, and 16). This elevator is in the form of a flat-topped cylindrical sleeve mounted on ball bearings upon a shaft 156. By this elevator the bottle is temporarily raised into the hooding mechanism, being free to be rotated by that mechanism because of the ball bearing mounting of the elevator. Shaft 156 is fixed to a member 157 (Fig. 5) pivoted to a pair of parallel arms 158 and 159 pivoted to the frame at 160 and 161 respectively. A spring 162, stretched between arm 159 and the frame, constantly tends to raise the elevator, with the latter held in an always vertical position by the parallel linkage which supports it. An arm 163, swinging on the pivot 160 and bearing a cam roll 164 running in a groove in the cylindrical cam 92, carries a set screw 165 adapted to rest upon the arm 158. As the cam rotates the elevator will be raised by the spring and lowered by the cam once during each cycle. By having the active stroke of the elevator made under the force of the spring only the bottles can be raised to an end position determined by their tops striking an abutment and not by the elevation given to their bottoms. This eliminates the effect of chance variation in bottle height, avoids danger of breakage, and makes it easy to adjust the exact position of the elevated bottle by means of a stop against which the bottle is raised by the action of the spring.

The stop against which the bottle is raised preferably also serves to hold the flat sheet of hood material to the top of the bottle during the preliminary shaping of the hood. The bottle contacting portion of the stop may be formed as an annulus 170 (Fig. 24), clamped between collars 171 and 172 riveted or otherwise secured to the end of a vertical shaft 173. This shaft is keyed at 174 to a hub 175 so that they are rotatable together but may have relative sliding movement. The hub is pinned at 176 to a sleeve 177, inside the other end of which a nut 178 is pinned at 179. A stop screw 180 is threaded into the nut to serve as an adjustable abutment limiting the upward travel of the shaft 173. The annulus 170 may rest on the bottle top under the force of its weight and that of the shaft, but it is preferred to augment this force by that of a fairly weak spring 181 compressed between the nut 178 and a collar 182 pinned to the shaft and also serving as a bearing to keep the shaft in a central position within the sleeve. For convenience in reproducing adjustments slotted washers 183 (Fig. 25) of varying thicknesses may be placed between the end of the sleeve and the head of the stop screw; the correct adjustment for any type of bottle being obtained when the stop screw is turned down into contact with the proper washer.

The sleeve 177 is rotatable in bearings 185 (Fig. 16) secured in an upper frame 186, which is movable up and down relative to the main frame by an adjustment to be described. A locking disk 187 is fixed to the sleeve and prevents its downward movement. Just above the locking disk is a pinion 188 freely rotatable on the sleeve and carrying a pawl arm 189. Upon this pawl arm a pawl 190 (Fig. 19) is pivoted, being spring pressed in the usual way to engage one of two opposite teeth 191 in a ratchet 192 fast upon the sleeve 177. A segmental gear 193 is pivoted at 194 to the upper frame and is connected by a link 195 to a crank pin upon a cam 196 fixed on the upper end of a shaft 197. This shaft is aligned with the stub shaft 93 and is keyed for sliding movement within a recess 198 (Fig. 6) formed in its upper end. By this means the shaft 197 and the parts driven by it may be rotated irrespective of the vertical adjustment of the upper frame. As the crank pin rotates the segmental gear will be oscillated back and forth, causing a corresponding oscillation of the pinion 188 and the pawl and an intermittent rotation in one direction of the ratchet driven sleeve 177. In the preferred case the sleeve is rotated through one and a half revolutions in half a cycle and then remains at rest during the remainder of the cycle. To hold the sleeve against rotation during its rest period a locking dog 199 is carried by a lever 200 pivoted to the upper frame and having a roll 201 held by a spring 202 against the cam 196. The dog 199 is adapted to enter opposite notches 203 formed in the locking disk.

Vertical adjustment of the upper frame 186 is necessary in order to adapt the machine to different bottles, such as quart and pint sizes, having different heights. The upper frame is carried on four corner posts 205 (Figs. 5 and 9), each slidable in bearings 206 on the lower frame 50 and provided with rack teeth which engage gears 207 carried by horizontal shafts 208. These shafts are coupled by worm gearing 209 with a horizontal shaft 210 at right angles to them. A handwheel 211 provides for manual rotation of the shaft 210 and the consequent simultaneous vertical motion of the four posts 205. For locking the upper frame in adjusted position the shaft 210 passes through a split bushing 212 adapted to be closed upon the shaft by a clamp screw 213.

Before the bottle is elevated against the clamp 170 a sheet of hood material s is severed from a supply web w and projected into the bottle path. The web material, which is preferably a transparent waterproof cellulose sheeting such for example as cellulose acetate or one of the other sheetings of this character, is supplied on a roll 215 rotatably mounted on brackets 216 provided with the usual centering and tension devices. From the reel the web passes over a guide roll 217 (Fig. 16) and between continuously driven feed rolls 218, 219. These rolls are geared together at 220 (Fig. 13) and the shaft of the upper one is joined by a chain and sprocket connection 221 (Fig. 1) to a constantly rotating cam shaft 222 coupled by spiral gearing 223 (Fig. 21) to the vertical shaft 197. The lower roll is preferably rubber covered, and its shaft is carried in a bracket 224 (Fig. 16) pivoted at 225 to the upper frame and spring-pressed so as to keep the rolls in yielding contact.

After leaving the continuous feed rolls the web passes along a bed-plate 226 to intermittent feed rolls 227 (Fig. 16) which are geared together at 228 (Fig. 13). As shown in Fig. 15, the shaft of the upper roll carries a pinion 229 which meshes with a gear 230 forming the driven member of a Geneva movement. The driving member 231 of the Geneva is fixed to the cam shaft 222. The two sets of rolls are so coordinated that the intermittent rolls feed very slightly more than the amount delivered by the continuous rolls during each cycle, so that no accumulation of slack can develop. Between the two sets of rolls is a rubber covered steel shell 232, loosely mounted upon a supporting shaft 233. When the intermittent rolls are at rest the continuous rolls keep on delivering the web, which forms in a loop or bend 234 (Fig. 48) back of the shell 232. Upon the starting up of the intermittent rolls the shell will at first rotate freely under the pull of the web, but when the shell is pulled over against its support an added resistance is offered and the web is drawn tightly and smoothly.

If it is desired that the hood present a relatively even edge around the neck of the bottle opposed V-shaped notches n (Fig. 50) are cut out of the web with the apices of the V's opposite each other and on the lines where the web is to be severed. An octagonal blank is thus produced, resulting in a hood having no undesirable degree of unevenness. For this purpose stationary cutting dies 235 are spaced slightly from V-shaped notches formed on opposite sides of the plate 226. Cooperating with the spaces between these stationary dies and the notches in the plate are movable dies 236 carried on a plunger 237 forked at its upper end to embrace the cam shaft 222 and guided by a link 238 turning upon the supporting shaft 233. The plunger bears at one side a cam roll 239 (Fig. 21) running in a groove formed in a cam 240 on the cam shaft 222. The plunger carries the usual spring-pressed tension pad 241 which holds the web firm and smooth during the cutting operation. It is also preferable to use stripper fingers 242 (Fig. 20) which extend through slots 243 in the upper dies, and are moved downwardly to throw out the V-shaped pieces cut by the dies. These fingers are carried by arms 244 (Fig. 13) pivoted upon the shaft 233 and joined by a counterweight 245. One of the arms is extended to carry a roll coacting with a cam 246 upon the cam shaft 222.

It is desirable to provide means for separating the two pairs of feed rolls in order to facilitate the threading of a web through the machine. The bracket 224 by which the lower of the continuous feed rolls is supported is provided with a round headed stud 250 (Fig. 16) normally lying in a groove 251 formed in a bar 252 reciprocable in guides 253. The lower of the two intermittent rolls is similarly mounted on a spring-pressed rocking lever 254 having a stud 255 normally lying just beyond the end of the bar 252. A lever 256 is pivoted centrally to the frame and at 258 to the bar, being extended at each end to form operating handles. This lever may be used to slide the bar 252 lengthwise, separating the two pairs of feed rolls simultaneously and holding them separated until the lever is moved back.

One desirable feature of the present machine is the possibility offered for forming an embossed marking upon that part of the hood spanning the bottle top. The hood material being transparent the usual printing appearing on the cardboard bottle cap of the milk bottle can be read through the hood irrespective of the presence of embossing on the latter, and the embossing itself may serve to convey a legend different from that on the caps. The two embossing dies 260 and 261 are set respectively into the plate 226 and the link 238. As the latter swings down in accordance with the motion given to the cutting die plunger the embossing dies will be brought together.

From the intermittent feed rolls the web is projected past shear blades 265, 266 onto a guide 267 which supports the severed piece until it is picked up by the bottle. The lower shear blade 265 is stationary; the upper one is pivoted at one end and operated by a link 268 connected to a lever 269 pivoted to the upper frame at 270. A roll 271 (Fig. 21) on this lever coacts with a cam 272 on the cam shaft 222 to operate the shears in proper timed relation. It has been found that the commercial material used for the transparent hoods is greatly affected by static electricity, and tends to cling to the surfaces of the feeding rolls. To prevent this, and to give to the web a rigidity helpful in projecting it onto the guide 267, the lower feed roll 227 is formed with ribs 273 (Fig. 3) extending into grooves 274 in the upper feed roll. Guide fingers 275 also extend through these grooves over the web, serving both to strip the web from the roll and by cooperation with the ribs 273 to corrugate the web temporarily and give it a greater longitudinal stiffness.

As the bottle is elevated by the plunger 155 it picks up the severed octagonal blank on the guide 267 and carries it through a crimping die 280 (Fig. 32). At the same time the bottle encounters the upper plunger 170 so that the blank is firmly clamped in position. The die 280 is annular in form and somewhat flaring toward its bottom. Arranged around the inner periphery of the die is a series of rounded buttons 281 which serve to crimp or plait the flat blank to turn it into cylindrical form around the bottle neck. Above the buttons the die is formed with an annular recess in which a wick 282 is located, the wick being used in certain cases for transferring a solvent to the outer surface of the blank in order to facilitate the application of an adhesive tape around the bottle neck. Such a solvent may or may not be necessary according to the nature of the material used for the hood and for the tape. When the solvent is desired it is supplied to the wick through a tube 283 from a receptacle 284, preferably of the constant level type, located at the rear of the machine. A series of transfer wicks 285 are shown as receiving the solvent from the tube and distributing it to the main wick 282.

The upward movement of the bottle continues until the blank has been carried entirely through the die and the upper plunger 170 has come to the limit of motion for which it is adjusted. The fact that the lower plunger is moved upwardly only by a spring prevents any damage to the bottle. In this position the bottle top is positioned within two circularly arranged sets of fingers 290 and 291, the former set being positioned to engage the bottle somewhat above the latter. Fingers 290 serve to hold the plaited hood firmly around the bottle top, while fingers 291 are operated by mechanism to be described to contact successively with the tape to hold it in position and are lifted individually to clear the portion of the tape which has not been applied to the bottle and therefore extends tangentially away from it. Fingers 290 are each pivoted on pins 292 extending through lugs 293 on the hub 175, being straddled on these pins by fingers 291 as shown in Fig. 27. Each of the fingers 290 has fixed to it a flat spring 294 (Figs. 27 and 38) forming part of a link 295 (Figs. 16 and 17). A second link 296 joins each link 295 with a shiftable collar 297 slidable on the outside of the sleeve 177. When the collar is raised as in Fig. 16 the links are drawn up and the fingers 290 are tilted away from the bottle. When the collar is depressed as in Fig. 17 the links 296 are turned horizontally and the upper ends of the springs 294 forced radially outwardly, causing the fingers 290 to be pressed yieldingly against the bottle. In order to raise and lower the collar 297 it is grooved on its periphery to receive a roll carried by a lever 298 pivoted on the shaft 270 and oscillated by a cam 299 on the cam shaft 222. The cam is designed to contract the fingers about the bottle as the bottle reaches its uppermost position and before the sleeve is revolved by the mechanism previously described.

The fingers 291 are arranged for individual operation, but are raised clear of the bottle as a unit by contact with the fingers 290. As the fingers 290 swing clear of the bottle in their return to inactive positions they strike the fingers 291 and push them out of the way as shown in Fig. 28. Each of the fingers 291 has an outward projection bearing a roll 300 which for the greater part of its travel during the rotation lies under a horseshoe shaped rail 301 mounted on rods 302 slidable in a guide 303. This guide is preferably held by a clamp screw 304 to a cylindrical projection 305 extending downwardly from the upper frame, so that the rail can be adjusted as to elevation and angular position. Springs 306 surround the rail to cause a yielding pressure on the rolls 300, and to permit the rail to be raised by a plate 307 extending into the groove in collar 297 and attached to one of the rods 302. By this means the rail is elevated out of the way when the fingers are moved to their inactive positions.

Each end of the horseshoe rail 301 slants sharply upwardly as at 310, and between these two points is an arcuate rail 311 secured to a bracket 312 on the upper frame. Downwardly turned projections 313 on each end of rail 311 form with the slanting portions 310 of the rail 301 an inclined cam path for the rolls 300. As the sleeve 197 revolves the rolls 300 pass through the major part of their rotation underneath the rail 301, but pass up and over the rail 311 as they reach it in succession. As each roll rises to pass over the rail 311 the finger 291 to which it is connected rises also, so that the finger lifts over the tangentially extending part of the tape and then returns to press against the bottle the portion of the tape which has been wound on the bottle neck. This action will be clearer after the mechanism for applying the tape has been described.

Tape $t$ is supplied to the machine upon a spool 320 (Fig. 14), rotatable on a pin 321 on a flanged support 322 having a flanged cover 323. The tape may be of cellulose acetate, or may be of paper or similar material either plain or coated with a dry gum or with other adhesive material. The manner in which the tape is treated in the machine depends upon its nature as will appear below. From the spool the tape passes between pins 324 on the support 322, around guides 325 and 326 (Fig. 41) and between a shoe 327 and a tape guide 328. The shoe and the guide 328 are both carried by an arm 329 pivoted upon a vertical shaft 330 and rocked periodically by mechanism which will be described below. The shoe 327 is conveniently formed integral with the arm while the finger is given a slight spring effect by forming it out of sheet metal secured to the bottom of the arm and bent upwardly at its side. When cut off by mechanism to be described the end of the tape projects slightly beyond the end of the shoe, in position to be picked up and drawn out by a reciprocating gripper.

The tape gripper is carried by a slide 335 movable in a stationary guideway 336. A link 337 is pivoted at one end to the slide at 338 and at the other end to a rocking lever 339 (Fig. 21) swinging upon the shaft 233. A pinion 340 on the hub of the lever meshes with teeth on a segment 341 pivoted at 342 to the upper frame and bearing a roll 343 running in a groove in a cam 344 on the cam shaft 222. By this mechanism the gripper is reciprocated once during each cycle from a point where it picks up the leading end of the tape to a position where the leading end of the then severed tape is located adjacent the neck of the bottle. One part 345 (Fig. 41) of the gripper is fixed to the slide, while the movable part 346 is carried upon a lever 347 pivoted to the slide at 348. The two parts of the gripper are connected by a toggle 349 having a roller 350 projecting below its central pivot, and are drawn towards each other by a tension spring 351. Besides giving to the gripper a yielding closing pressure this spring acts to hold the toggle with the central pivot at either side of its center line, according to the direction in which the roller 350 may be pushed by contact with two stationary stops 352 and 353. When the slide is moving to the right as viewed in Fig. 41 the gripper is open, the roll 350 being initially to the right of the center line of the toggle, and the toggle being held against the action of the spring by contact of the roll with the part 346, as shown in Fig. 44. As soon as the open gripper receives the end of the tape the roll 350 strikes the stop 352, closing the gripper on the tape, as shown in Fig. 41.

The gripper slide then starts moving towards the bottle, drawing out the tape as it goes. When it has left the tape-receiving station the arm 329 is moved slightly on its pivot (compare Figs. 41 and 42) to bring the tape against a glue or moistening roll 355. For moving the arm a pin 356 (Fig. 41) is secured to it and passes freely through a second arm 357 also pivoted to the shaft 330, a compression spring 358 normally holding the two arms pressed apart to the limit permitted by a stop pin 359. A roll 360 (Fig. 18) carried by the arm 357 rests against a crown cam 361 mounted on a shaft 362 driven by a chain and sprocket connection 363 (Fig. 16) with the main cam shaft 222. The moistening roll 355 is of frusto-conical form and is set at an angle, dipping into a tank 364 which is kept filled with adhesive. Its shaft 365 (Fig. 18) is connected by bevel gears 366 with a jack shaft 367 joined by spiral gears 368 with the shaft 362. The roll 355 is thus driven continuously during the operation of the machine. In cases where a tape is used the surface of which is to be coated with a solvent instead of with an adhesive, it is sometimes desirable to apply the solvent by means of a wick instead of by the rotating wheel. The tank 364 is for this reason divided by a partition 369 (Figs. 14 and 22) into two compartments, into one of which the wheel 355 dips. The other of the compartments is slotted at its top to permit the passage of a wick 370 which, when used, extends out of the tank through a hole in the rocking arm 329. In this case the rocking of the arm has no function in applying the solvent, but as the rocking is part of the tape severing operation it is not discontinued.

Further motion of the gripper slide brings the leading end of the tape adjacent the side of the bottle neck, as in Fig. 43, which shows the position of the gripper just before it releases the tape by contact of the roll 350 and the stop 353. In their approach to this position the gripper and tape pass under that one of the then stationary tape holding fingers 291 which is held elevated by the rail 311. At about this point two tape tensioning devices come into play to hold the tape taut during its application to the bottle neck. On account of the very short time allowed in the machine cycle for holding the completely applied tape, it is of great importance to have the tape applied smoothly and with a high degree of tightness. With a very adhesive tape one of the tensioning devices could be dispensed with, but it is preferable to employ them both as a matter of insurance that the tape will not come loose.

The first of these tension devices acts upon the tape between the bottle and the tape coating device. A flat spring 375 is secured to the side of the gripper slide and carries at its end a U-shaped tape guide 376 having internal vertically extending ribs 377. This guide opens at its side to receive the scalloped rib 378 of a stationary tension member 379 attached to a square shank 380 slidable in a guide 381 (Fig. 40). The end of the shank 380 is threaded at 382 to receive a nut 383 having a knurled flange 384 entering into a groove 385 in a bracket 386. A spring 387 on the bracket bears on the knurled nut to hold it in adjusted position. It will be seen that the tape will be guided at the top by the flange 388 of the member 376 and at the bottom by the flange 389 of the member 379. The tension imposed on the tape is regulable by turning the nut 383. The members 376 and 379 are brought into adjacency as the gripper slide reaches the position of Fig. 44 by contact of an abutment 390 (Fig. 46) on the spring 375 with a stationary slanting cam 391 (Fig. 45) carried by the frame. At about this time the tape is severed by means to be described, and the trailing end of the severed tape is guided and held taut by the members 376 and 379, which remain together until after the tape has passed. It will be noted that the tape contacts only with the scalloped rib 378 on its coated side, resulting in a minimum of coating being scraped off.

A second tensioning device starts its operation at about this same time. This device comprises an arm 400 pivoted to the gripper slide at 348 and having a finger portion 402 adapted to press the tape against the neck of the bottle. Normally this arm is held out of the way by a spring 403. A second arm 404 fixed to arm 400 is positioned to contact with a spring plunger 405, which is mounted in the frame, when the gripper carriage nears the end of its path. When the latter arm strikes the spring plunger the finger 402 is swung against the bottle neck, as shown in Fig. 44.

The tape is severed by a knife 410 mounted upon the arm 357 previously described. As this arm is swung back from the position in which it acts to hold the tape against the glue wheel it brings the knife into register with a notch 411 (Fig. 44) in the gripper carriage across which the tape is stretched. At the same time a flange 412 on the end of the tape guide 328 strikes the gripper carriage, closing up the guide against the shoe 327 and holding it taut during the cutting operation. The other side of the tape is held at this time by the tension device 376, 379.

Shortly after the tape is severed it is released by the grippers and is carried against the bottle neck by that finger 291 which has been kept raised during the period of rest of the bottle rotating head. As this finger descends it grips the tape closely to the underlying hood on the now rotating bottle (Fig. 44). Continued rotation of the bottle draws the tape through the tension device 376, 379 while the drag finger 402 smooths the tape against the underlying hood (Fig. 54). The fingers 291 lift over the tape and the drag finger as their rolls 300 successively ride over the stationary rail 311. Preferably the bottle is given a turn and a half, although the actual overlap of the tape upon itself is not necessarily a full half turn. The trailing end of the tape is pressed against the bottle neck by the same finger 291 that contacted with its leading end (Fig. 55).

The shape of the hood is dependent upon whether the web $w$ is notched at one side as in Fig. 49 and as shown in full lines in Figs. 50 and 51, or is notched at both sides as shown in Fig. 20 and in dotted lines in Figs. 50 and 51. The former method leaves two angular corners, which project below the tape $t$ as shown at $x$ in Fig. 52. If both sides of the web are notched the hood has the more even appearance shown in Fig. 53. The tabs $x$ may in some cases be desired in order to facilitate tearing the hood from the bottle. It is obvious that the edge of the hood could be made still smoother than that shown in Fig. 53 by making the notches rounded concentrically with the center of the blank, or could be formed with a single tab by cutting a half notch in the side shown uncut in Fig. 50. These and other adaptations to suit special conditions can be made readily by those skilled in the art, and while the mechanism has been described in some detail for clarity it will be understood that the invention is not restricted to the particular embodiment shown.

The operation of the machine taken as a whole will now be summarized briefly. Bottles to be hooded are placed manually or otherwise upon the continuously moving slat conveyer 65 and are directed by the guides 140, 141 to the star wheel 125. As the star wheel revolves intermittently the bottles are carried one by one upon the elevator 155, the wheel remaining stationary while the elevator moves up to hooding position and then back to its original place. In the meantime the feeding devices have forwarded, notched, and cut off a blank $s$ from the web $w$ and have left this blank supported by the guide 267. The bottle in its upward movement forces this blank against the upper plunger 170, which prevents slipping, and then carries the blank through the plaiting die 280. Reaching its uppermost position the bottle comes within the two series of fingers 290 and 291, the former fingers and all but one of the latter closing in about the bottle to iron down the plaits and to hold the hood and its skirted portion firmly in place. The tape $t$ has been coated and advancing into bottle contacting position during the hood shaping operation, and is now pressed against the hood skirt by the finger 402 and by the previously raised finger 291 which comes into pressing position as the fingers and the bottle begin their tape winding rotation. When the rotation of the bottle has progressed sufficiently to wind up and hold to the bottle the entire length of tape, the fingers cease their rotation and open to permit the bottle to be lowered by the descent of the elevator. The completely hooded bottle is then carried out of the machine by the star wheel and the slat conveyer.

It is preferable to provide a device for assisting in the adjustment of the machine for different sizes of bottles, which will be positive in action and not subject to error due to the operator's misreading a scale, and will accommodate slight changes in bottle size. In Fig. 1a is shown a support 450 secured to the lower frame 50 and on which a bottle may be set. Upon one of the posts 205 is fastened a gage head 451 to which is a conical abutment 452 adapted to fit in the top of a bottle. In adjusting the machine the upper head is elevated by turning handwheel 211 until a sample bottle can be placed on the support 450 beneath the gage 451. The upper head is then lowered until the gage rests upon the bottle top, the upper head being by this means positioned at the exact height necessary for operation upon bottles of the size of the sample. The conical abutment 452 is preferably used to enter the top of the sample bottle and prevent its removal, providing a visual indication that the machine is correctly adjusted.

I claim:

1. A bottle hooding machine comprising a yieldable elevating plunger, a freely rotatable head on the plunger, a bottle hooding mechanism into which the bottle is raised by the plunger including means for rotating the bottle and a stop limiting the movement of the bottle, and means for applying a tape to the hooded bottle during its rotation.

2. A bottle hooding machine comprising a rotating head, means for causing relative axial movement between the head and a bottle provided with a skirted cap, a set of fingers arranged in an annular series and adapted to contact with the lip portion of the bottle, a second set of fingers arranged in an annular series and adapted to contact with the neck portion of the bottle to press a tape against it, both sets of fingers being rotatable with the head, means for opening and closing the fingers, a device for presenting a tape tangentially to the bottle, and means for lifting the fingers of the second set individually and successively over the tangential portion of the tape.

3. A bottle hooding machine comprising a rotating head, means for causing relative axial movement between the head and a bottle provided with a skirted cap, a set of fingers arranged in an annular series and adapted to contact with the lip portion of the bottle, a second set of fingers arranged in an annular series outside of the first set and adapted to contact with the neck portion of the bottle, means for connecting both sets of fingers to the head for rotation therewith, means for moving the first set of fingers towards and away from the bottle, the first set of fingers in their outward movement moving the second set away from the bottle, means for pressing the fingers of the second set yieldingly towards the bottle, a device for presenting a tape tangentially to the bottle, and means for lifting the fingers of the second set individually and successively over the tangential portion of the tape.

4. A bottle hooding machine comprising a bottle elevating plunger, means for delivering a blank of hooding material across the top of the bottle, a pleating die through which the bottle and blank are raised by the plunger, said die including an annular solvent carrying wick operating to apply a solvent to the pleated exterior of the hood blank, and means for winding a tape around the coated exterior of the hood.

5. A bottle hooding machine comprising a bottle elevating plunger, means for delivering a blank of hooding material across the top of the bottle, a pleating die through which the bottle and blank are raised by the plunger, said die including an annular solvent carrying wick operable to contact with the pleated exterior of the cap and increase its adhesive properties, means for seizing the bottle after its neck has been projected through the die and for rotating it, means for supplying a tape to the rotating hooded bottle neck, and means for rendering the hood contacting face of the tape adhesive.

6. A bottle hooding machine comprising means for applying a hood to a bottle, means for coating the exterior of the hood with a liquid operable to enhance its adhesive properties, and means for winding an adhesive tape about the coated exterior of the hood.

7. A bottle hooding machine comprising a device for presenting a tape tangentially to a hooded bottle, a plurality of fingers arranged in an annular series around the neck of the bottle to press the tape against the hood, means for rotating the fingers as a unit, and means for raising the fingers individually over the tangential portion of the tape during their rotation.

8. A bottle hooding machine comprising a device for presenting a tape tangentially to a hooded bottle, a plurality of fingers arranged in an annular series around the neck of the bottle to press the tape against the hood, means for rotating the fingers as a unit, means for moving the series of fingers as a unit radially toward and away from the bottle, and means for raising the fingers individually over the tangential portion of the tape during their rotation.

9. A bottle hooding machine comprising a device for presenting a tape tangentially to a hooded bottle, a plurality of fingers arranged in an annular series around the neck of the bottle to press the tape against the hood, means for rotating the fingers as a unit, a roller carried by each of said fingers, and a cam track for said rollers shaped to cause the fingers to be lifted successively over the tangential portion of the tape and then be returned into pressing contact with the tape.

10. A bottle hooding machine comprising a device for presenting a tape tangentially to a hooded bottle, a plurality of fingers arranged in an annular series around the neck of the bottle to press the tape against the hood, means for rotating the fingers as a unit, a roller carried by each of said fingers, and a spring pressed cam track for said rollers shaped to cause the fingers to be lifted successively over the tangential portion of the tape and then be returned into pressing contact with the tape.

11. A bottle hooding machine comprising means for applying a skirted hood to a bottle, means for positioning the leading end of a tape adjacent the bottle, means for rotating the bottle with the hood thereon and for holding the tape to the hood during its rotation, means for severing a length of tape from a web, and a tension device operable to exert a constant pull on the tape as it is being wound on the bottle.

12. A bottle hooding machine comprising means for applying a skirted hood to a bottle, means for rotating the bottle with the hood thereon, a support for the leading end of a tape web, a reciprocating gripper operable to seize the end of the web and carry it to a position adjacent the bottle, means for pressing the tape against the bottle, means for severing the tape, and a tension device operable to exert a constant pull on the severed tape as it is being wound on the bottle.

13. A bottle hooding machine comprising means for applying a skirted hood to a bottle, means for rotating the bottle with the hood thereon, a support for the leading end of a tape web, a reciprocating gripper operable to seize the end of the web and carry it to a position adjacent the bottle, means for pressing the tape against the bottle, means for severing the tape, and a tension device operable through substantially line contact with the tape to bend it in serpentine form and thus to exert a constant pull on the severed tape as it is being wound on the bottle.

14. A bottle hooding machine comprising means for rotating a bottle having a skirted hood thereon, a tape supply, means for drawing out a length of tape and positioning its leading end adjacent the bottle, means for severing the tape, means for holding the leading end of the tape against the bottle during its rotation, and means for holding the severed tape under tension until it is substantially completely wound upon the bottle neck.

15. A bottle hooding machine comprising means for rotating a bottle having a skirted hood thereon, means for positioning a severed length of adhesive coated tape with its leading end adjacent the bottle, and means for holding the severed tape under tension until it is substantially completely wound upon the bottle neck.

16. A bottle hooding machine comprising means for rotating a bottle having a skirted hood thereon, means for positioning a severed length of adhesive coated tape with its leading end adjacent the bottle, means for holding the tape against the bottle neck including a circular series of fingers and operating mechanism therefor causing the fingers to engage the tape successively as it is wound on the bottle, and means for holding the severed tape under tension until it is substantially completely wound upon the bottle neck.

17. A bottle hooding machine comprising means for rotating a bottle having a skirted hood thereon, means for holding a tape to the hood on the rotating bottle, and a drag finger positioned to bear upon the tape at substantially its point of tangency with the bottle hood.

18. A bottle hooding machine comprising means for rotating a bottle having a skirted hood thereon, means for holding a tape to the hood on the rotating bottle including a circular series of fingers, a drag finger positioned to bear upon the tape at substantially its point of tangency with the bottle hood, and means for lifting the fingers one at a time over the drag finger.

19. A bottle hooding machine comprising means for rotating a bottle having a skirted hood thereon, a reciprocating carriage, a gripper on the carriage operable to seize the free end of a tape web and carry it to a point adjacent the bottle, means for severing the tape, means for holding the tape to the rotating bottle, and a drag finger operable to press the tape against the bottle hood and to drag thereon as the bottle is rotated.

20. A bottle hooding machine comprising means for rotating a bottle having a skirted hood thereon, means for positioning a severed length of adhesive coated tape with its leading end adjacent the bottle, and opposed interfitting tape engaging members shaped to impose a serpentine form on the tape and thus to hold the tape under tension as it is being wound on the bottle.

21. A bottle hooding machine comprising means for rotating a bottle having a skirted hood thereon, means for positioning a severed length of adhesive coated tape with its leading end adjacent the bottle, means for holding the leading end of the tape against the bottle neck during its rotation, opposed interfitting tape engaging members shaped to impose a serpentine form on the tape and thus to hold the tape under tension as it is being wound on the bottle, and a drag finger positioned to press the tape against the bottle at substantially its point of tangency.

22. A bottle hooding machine comprising means for rotating a bottle having a skirted hood thereon means for positioning a severed length of adhesive coated tape with its leading end adjacent the bottle, means including a rotatable circular series of fingers for holding the tape upon the bottle during its rotation, opposed interfitting tape engaging fingers shaped to impose a serpentine form on the tape and thus to hold it under tension as it is being wound on the bottle, a drag finger positioned to press the tape against the bottle at substantially its point of tangency, and means for raising the fingers of the circular series one at a time over the drag finger and the tangential portion of the tape.

23. A bottle hooding machine comprising a supply for a web of hooding material, means for forwarding the web, notching cutters operative to form notches in at least one side of the web, means for severing the web at the notched portion, and means for conforming the severed blank to a bottle.

24. A bottle hooding machine comprising, a supply for a web of hooding material, means for forwarding the web, notching cutters operative to form notches in one side only of the web, means for severing the web at the notched portion, means for conforming the severed blank to a bottle, and means for securing a tape around the skirt of the conformed blank leaving a pair of tabs projecting below the tape.

25. A bottle hooding machine comprising a supply for a web of hooding material, continuously moving feed rollers for forwarding the web, intermittently moving feed rollers operative to receive the web from the continuous rollers and advancing it therefrom, the web accumulating between the two sets of rollers, notching cutters operable on a stationary portion of the accumulated web, means for severing the web in alinement with the notches, and means for conforming the severed blanks to a bottle.

26. A bottle hooding machine comprising a supply for a web of hooding material, means for embossing the web at intervals, means for nicking the web at intervals spaced between the embossings, means for severing the web in alinement with the nicks to produce a polygonal blank with the embossing substantially centrally disposed thereon, and means for conforming the severed blanks to a bottle.

27. A bottle hooding machine comprising a set of fingers arranged in an annular series and adapted to contact with the lip portion of a bottle provided with a skirted cap, a second set of fingers arranged in an annular series and adapted to contact with the neck portion of the bottle to press a tape against it, means for opening and closing the fingers, a device for presenting a tape tangentially to the bottle, means for causing relative rotation between the bottle and said device, and means for lifting the fingers of the second set individually and successively over the tangential portion of the tape.

28. A bottle hooding machine comprising a series of fingers, mechanism for positioning a bottle provided with a skirted cap and said fingers relative to each other so that the fingers embrace the bottle, a device for presenting a tape tangentially to the bottle, means for causing relative rotation between the bottle and said device to cause the tape to be wound on the bottle, and means for lifting the fingers individually and successively over the tangential portion of the tape.

29. A bottle hooding machine comprising means for applying a skirted hood to a bottle, means for positioning the leading end of a tape adjacent the bottle, mechanism for causing relative rotation between the bottle and said tape positioning means to cause the tape to be wound up on the bottle, means for severing a length of tape, and a tension device operable to exert a constant pull on the severed tape as it is being wound on the bottle.

30. A bottle hooding machine comprising means for supporting a bottle having a skirted hood thereon, means for positioning adjacent the bottle a length of tape adapted to adhere to the skirted hood, means for causing relative rotation between the bottle and the tape positioning means to cause the tape to be wound around the bottle, a cutter operable to sever the tape prior to its complete application to the bottle, and mechanism for holding the tape under tension during its application to the bottle and after its severance.

31. A bottle hooding machine comprising means for supporting a bottle having a skirted hood thereon, means for positioning adjacent the bottle a length of tape adapted to adhere to the skirted hood, means for causing relative rotation between the bottle and the tape positioning means to cause the tape to be wound around the bottle, a cutter operable to sever the tape prior to its complete application to the bottle, and mechanism for holding the tape under tension during its application to the bottle and after its severance, said mechanism comprising members engaging the tape through substantially line contact and positioned to bend it into serpentine form.

32. A bottle hooding machine comprising means for supporting a bottle having a skirted hood thereon, means for presenting a tape tangentially to the hood on the bottle, a drag finger positioned to bear upon the tape at substantially its point of tangency with the bottle hood, and mechanism for causing relative rotation between the bottle on the one hand and the tape presenting means and drag finger on the other to cause the tape to be wound upon the bottle.

33. A bottle hooding machine comprising means for supporting a bottle having a skirted hood thereon, means for presenting a tape tangentially to the hood on the bottle, means for holding the tape to the hood including a circular series of fingers, a drag finger positioned to bear upon the tape at substantially its point of tangency with the bottle hood, mechanism for causing relative rotation between the bottle and fingers on the one hand and the tape presenting means and the drag finger on the other hand, and means for lifting the fingers one at a time over the drag finger.

34. A bottle hooding machine comprising means for supporting a bottle having a skirted hood thereon, means for positioning a severed length of adhesive coated tape with its leading end adjacent the bottle, mechanism for causing relative rotation between the bottle supporting means and the tape positioning means to cause the tape to be wound on the bottle around the skirt of the hood, and opposed interfitting tape engaging members shaped to impose a serpentine form on the tape and thus to hold the tape under tension as it is being wound on the bottle.

35. A bottle hooding machine comprising means for supporting a bottle having a skirted hood thereon, means for positioning a severed length of adhesive coated tape with its leading end adjacent the bottle, means for holding the leading end of the tape against the bottle neck, a drag finger positioned to press the tape against the bottle at substantially its point of tangency, mechanism for causing relative rotation between the bottle supporting means and the tape end holding means on the one hand and the tape positioning means and the drag finger on the other hand to cause the tape to be wound upon the bottle around the skirt of the hood, and opposed interfitting tape engaging members shaped to impose a serpentine form on the tape and thus to hold the tape under tension as it is being wound on the bottle.

36. A bottle hooding machine comprising means for supporting a bottle having a skirted hood thereon, means for positioning a severed length of adhesive coated tape with its leading end adjacent the bottle, means including a circular series of fingers for holding the tape to the hood, a drag finger positioned to press the tape against the bottle at substantially its point of tangency, opposed interfitting tape engaging members shaped to impose a serpentine form on the tape and thus to hold the tape under tension as it is being wound on the bottle, mechanism for causing relative rotation between the bottle supporting means and the fingers on the one hand and the tape positioning means, the drag finger, and the interfitting members on the other hand to cause the tape to be wound on the bottle, and means for lifting the fingers one at a time over the drag finger.

HERMANN OTTO FISCHER.